United States Patent [19]

Oeffling et al.

[11] Patent Number: 4,869,283
[45] Date of Patent: Sep. 26, 1989

[54] DEVICE FOR TRAPPING FUEL VAPORS DURING THE REFUELLING OF A FUEL TANK

[75] Inventors: Heiner Oeffling, Wolfschulgen; Harald Böhringer, Neuhausen; Dieter Scheurenbrand, Wolfschlugen; Helmut Wawra, Korb, all of Fed. Rep. of Germany

[73] Assignee: Daimler-Benz Aktiengesellschaft, Stuttgart, Fed. Rep. of Germany

[21] Appl. No.: 282,573

[22] Filed: Dec. 12, 1988

[30] Foreign Application Priority Data

Dec. 12, 1987 [DE] Fed. Rep. of Germany ....... 3742256

[51] Int. Cl.⁴ ............................................. F16K 17/36
[52] U.S. Cl. ........................................ 137/43; 141/52; 141/59; 141/326; 220/86 R
[58] Field of Search ...................... 137/43; 141/44, 51, 141/52, 59, 326; 220/86 R, 85 VR

[56] References Cited

U.S. PATENT DOCUMENTS

| 4,625,777 | 11/1985 | Schmidt | 141/326 X |
| 4,655,238 | 4/1987 | Szlaga | 137/43 |
| 4,659,346 | 4/1987 | Uranishi | 220/86 R X |
| 4,747,508 | 5/1988 | Sherwood | 141/59 X |

FOREIGN PATENT DOCUMENTS 3605708 10/1986 Fed. Rep. of Germany .

Primary Examiner—Robert G. Nilson
Attorney, Agent, or Firm—Barnes & Thornburg

[57] ABSTRACT

A device for trapping fuel vapors during the refuelling of a fuel tank having a vapor control valve and which during refuelling, is moved into an open position provided outside the tank filler pipe safety valve which closes under the influence of gravity due to certain inclined positions of the fuel tank is connected upstream of the control valve, so that no fuel can escape through the vapor vent line in the case of a crash, even if the control valve no longer closes.

20 Claims, 3 Drawing Sheets

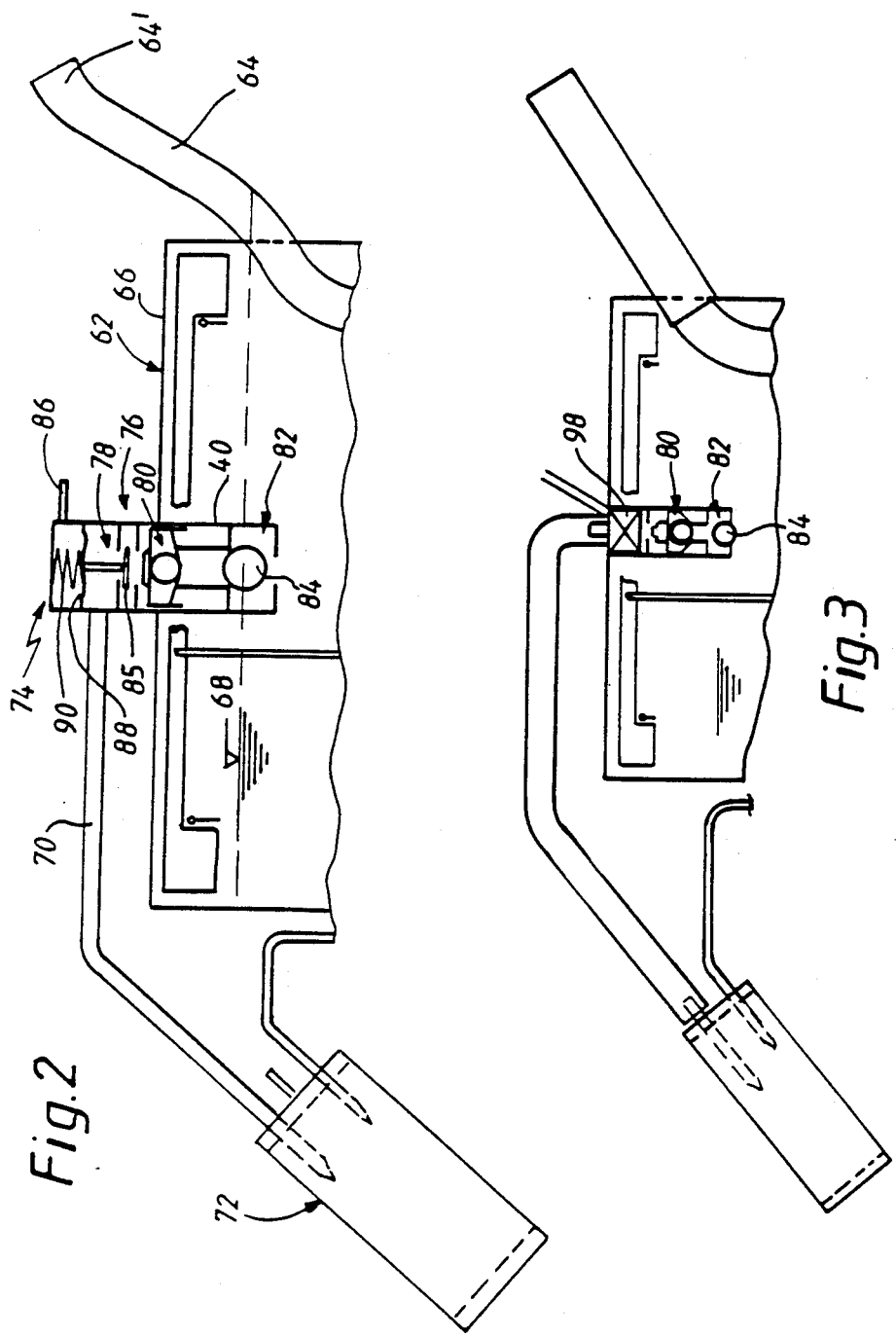

DEVICE FOR TRAPPING FUEL VAPORS DURING THE REFUELLING OF A FUEL TANK

BACKGROUND AND SUMMARY OF INVENTION

The invention relates to a device for trapping fuel vapors during the refuelling of a fuel tank, having a control valve located above the maximum fuel fill level of the tank to allow passage of fuel vapor from the tank to an activated carbon filter during refilling of the fuel tank and which denies passage of fuel vapors when the refilling ceases.

In a known device of this kind (German Offenlegungsschrift No. 3,605,708), a self-closing control valve is installed in the filler pipe of the fuel tank. When the filler pipe is closed, it ensures that there is no connection between the activated carbon filter and the fuel tank and that a desired positive pressure is thus maintained in the fuel tank. In addition, it also ensures that no fuel can escape into the open via the activated carbon filter in the event of the fuel tank being in an inclined or upside down position due to an accident.

For refuelling, this control valve is brought into its open throughflow position so that the fuel vapors, which are composed of hydrocarbons and are hence highly detrimental to health, cannot flow out of the fuel tank into the atmosphere but can flow off into the activated carbon filter.

In this arrangement, the filler nozzle of a fuel dispenser is introduced into the filler pipe and is used for opening the control valve. In order to avoid relatively large quantities of fuel vapors being able to flow out into the open end of the filler pipe even as the filler nozzle is being introduced, a guide channel restricts the filler pipe and has an inner end held closed by means of a self-closing closure flap provided for the filler nozzle inside the filler pipe. A forked operating lever associated with the value element of the control valve is secured on this closure flap. A tubular seal which surrounds the fuel dispenser filler nozzle at its outer periphery is provided inside the guide channel for sealing the nozzle upon its insertion into the pipe.

When the fuel dispenser filler nozzle swivels the closure flap into its open position, the fork legs of the operating lever come to rest against a head of a valve element shaft of the control valve and pull the valve element against the action of a restoring force into an open position, which establishes a connection of the fuel tank to the activated carbon filter. The fuel vapors can thus flow off during refuelling without escaping from the opened filler pipe.

A disadvantage in this construction is that it is necessary for the self-closing control valve to function perfectly in the event of the fuel tank being in an inclined or upside down position due to an accident, in order to insure that no fuel will flow from the fuel tank to the active carbon and thereby into the open atmosphere. However, such functioning is not guaranteed in the event of a crash when the filler pipe is deformed. For example, the control valve area or the valve element could be displaced in the direction of its open position in such a deforming happenstance. In addition, accommodating the control valve as well as guiding and sealing the fuel dispenser filler nozzle in the filler pipe is expensive in terms of construction and requires connections on the filler pipe for two fuel vapor lines which are to be installed outside the latter to be guided away from the fuel tank and which can easily be torn off in the even of an accident.

The object on which the instant invention is based is therefore to improve a device for trapping fuel vapors during the refuelling of a fuel tank, having a control valve located above the maximum fuel fill level of the tank to allow passage of fuel vapor from the tank to an activated carbon filter during refilling of the fuel tank and which denys passage of fuel vapors when the refilling ceases. The improvement provides: that even when the control valve does not close, or no longer closes perfectly, fuel cannot flow into the activated carbon filter in the event of the fuel tank being in an inclined or upside down position; that the control valve works independently of the introduction of the fuel dispenser into the filler pipe; that the control valve and tank can be located away from the filler pipe, in an accident-safe zone; and that only a single fuel vapor line, leading from the control valve to the activated carbon filter, has to be installed.

This object is achieved by having the control valve form a part of a valve unit which, comprises at least one further safety valve which is connected upstream of the control valve and which closes automatically under the influence of gravity from a certain inclined position of the fuel tank to interrupt the connection of the control valve with the interior of the fuel tank.

This valve unit can be installed at a suitable location on the upper wall part of the fuel tank so that it fits into the latter and that with the safety valve open, a direct connection between the tank interior and the control valve is ensured without an additional connecting line.

The equipping of the valve unit with just two valves is sufficient, provided that when the maximum fuel level is reached, the fuel has also risen in the filler pipe to such an extent that the automatic shut-off device of the fuel dispenser can come into operation and the supply of fuel into the tank is interrupted.

If, on the other hand, the orifice of the filler pipe is a long way above the maximum fuel level, it should include a float valve connected upstream of the safety valve to close off the vapor line when the maximum fuel tank level is reached and to thus allow fuel in the filler pipe to continue to rise after the closure of the float valve for the purpose of shutting off the fuel supplied by the fuel dispenser.

It is an advantage of the invention if a single valve unit house all the valves thus allowing for installation in an advantageous manner.

For the purpose of refuelling, it is advantageous if the control valve is power activated while the other valves are automatically actuated. The power control can be from a bowden cable attached to the filler pipe lid; a vacuum actuation from the engine; or an electric solenoid valve response to engine operation or vehicle movement.

Other objects, advantages and novel features of the present invention will become apparent from the following detailed description of the invention when considered in conjunction with the accompanying drawings.

BRIEF DESCRIPTION OF THE DRAWINGS

FIG. 2 shows a part view of a fuel tank similar to that in FIG. 1, the control valve of which is vacuum-controlled, FIG. 3 shows a part view of a fuel tank similar to that in FIG. 2, wherein the control valve can be electrically controlled.

DETAILED DESCRIPTION OF THE DRAWINGS

Figure 1:
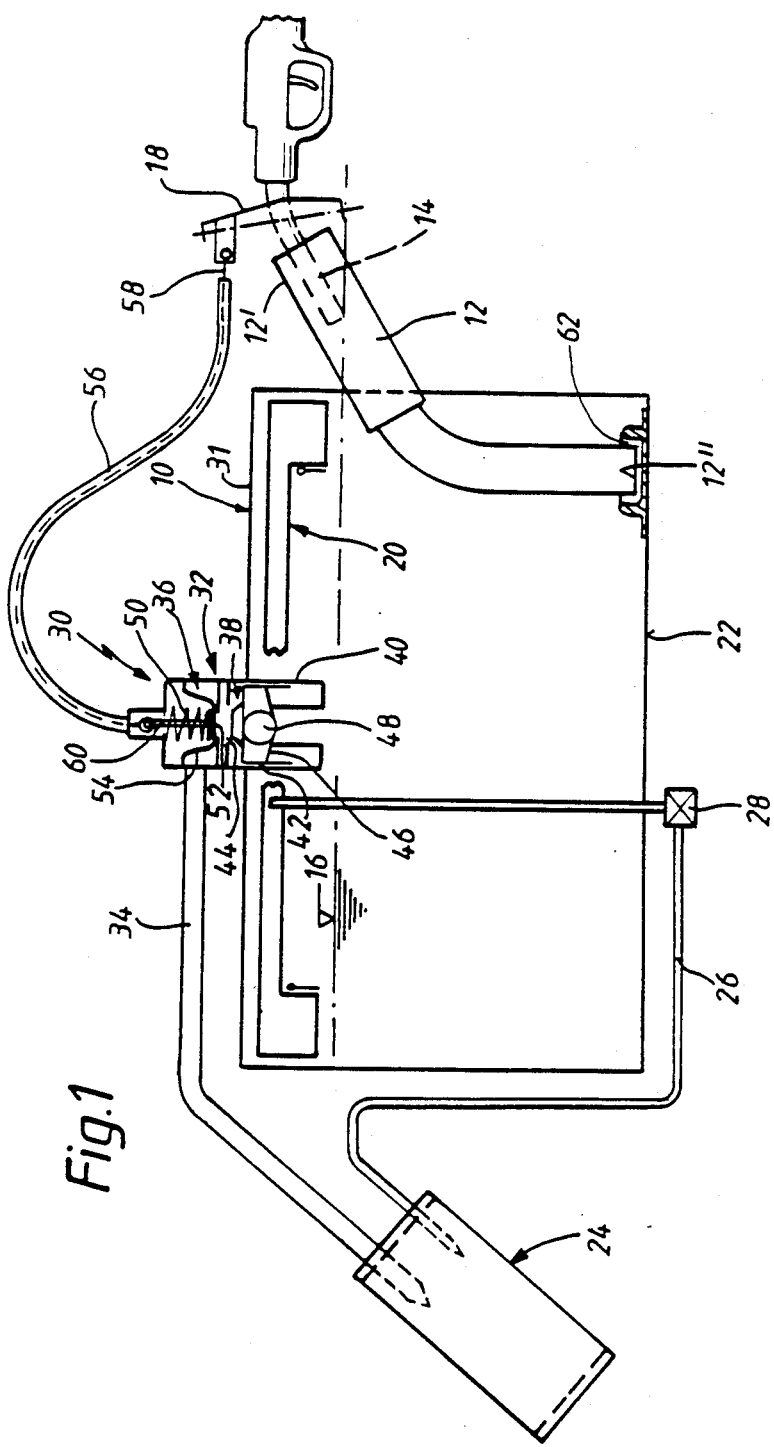
FIG. 1 shows an overall view of a fuel tank which is fitted with a collecting device according to the invention, the control valve of which can be controlled mechanically by means of the filler inlet compartment lid which closes the tank filler pipe.

In referencing FIG. 1, there is a fuel tank 10 with a closeable filler pipe 12. A closeable pipe end 12' receives a filler nozzle 14 of a fuel dispenser in such a way that when the fuel rises in the filler pipe 12 during refuelling and reaches the maximum tank filling level 16, it triggers the automatic shut-off mechanism of a fuel dispenser so as to interrupt the supply of fuel. The pipe end 12' is situated behind a filler inlet compartment lid 18, which can be pivoted into an open position on a part of the body of a motor vehicle.

The fuel tank 10 is equipped in the usual way with a ventilation device 20. A vent line 26 is connected to the ventilation device and extends downward to and out of the tank base 22 to an active carbon filter 24. The vent line 26 is equipped with a tank breather valve 28.

30 designates a device for trapping fuel vapors produced during refuelling operations and has a valve unit 32 located in the upper tank wall 31 and above the maximum tank filling level 16. This forms a constructional unit which consists of only two serially connected valves: namely a control valve 36 connected via a fuel vapor line 34 to the activated carbon filter 24 and a safety valve 38 connected upstream of said control valve 36 in the direction of flow of fuel vapors.

The safety valve 38 has a valve element 42, which is displaceably guided in a housing 40 of the valve unit 32 and can be moved under the influence of gravity into its closing position to close valve opening 44 as soon as the fuel tank 10 assumes a certain inclined position or is turned upside down due to an accident. The shift in the closing direction is accomplished by means of a ball 48, which rests in the housing 40 on a crop 46 and on which the valve element 42 is supported.

The control valve 36, which, according to FIG. 1, is situated above the safety valve 38, has a valve element 54 which is biased by means of restoring spring 50 to its closing position wherein element 54 closes a valve throat 52. The valve element 54 is preferably formed by a diaphragm and can be moved mechanically into its open throughflow position by the filler inlet compartment lid 18 when the latter is opened. When opened, a connection between the activated carbon filter 24 and the fuel tank interior is thereby established.

A Bowden cable 56, the wire 58 of which is secured at one end to the filler inlet compartment lid 18 and on the other hand to a tappet 60 held at the diaphragm, is provided for operating the valve element 54.

With the filler inlet compartment lid 18 closed and during normal operation of the vehicle, the restoring spring 50 holds the control valve 36 closed. Thus fuel vapors produced in the fuel tank 10 are thereby prevented from flowing into the activated carbon filter 24 through valve 36. This ensures that a desired defined positive pressure is established in the fuel tank 10 by means of the tank breather valve 28, which opens as a function of pressure and that no fuel can pass out through the fuel vapor line 34 into the activated carbon filter 24 during cornering of the vehicle.

When the filler inlet compartment lid 18 is opened, the control valve 36 is simultaneously opened due to the action of the bowden cable 56. Then fuel vapors can flow into the activated carbon filter 24 in order to produce a pressure balance in the tank and no hydrocarbon is forced out of the filler pipe 12 when the latter is opened.

The inner end 12' of the filler pipe 12 can be enclosed in an air trap at the bottom of the tank 22, as indicated at 62, or provided with a reserve of fuel, so that even when the fuel tank 10 is for the most part empty, no fuel vapors can pass out of it into the filler pipe 12. If, for any reason, the control valve 36 does not close, or no longer closes reliably, when the filler inlet compartment lid 18 is closed, then in the case of an inclined or upside down position of the fuel tank 10, due, for example, to an accident, in which the filler inlet compartment lid 18 may also be moved to the open position, the safety valve 38 then closes to ensure that fuel can not flow out via the fuel vapor line 34 to the activated carbon filter 24.

It is within the scope of the invention to provide another mechanically operating connection, for example a corresponding lever connection, between filler inlet compartment lid 18 and control valve 36 instead of the Bowden cable 56, 58.

FIG. 2 shows a fuel tank 62 in which the closable outer end piece 64' of the filler pipe 64 is situated in a plane above the upper tank wall 66.

Here during refuelling, the fuel will rise to a maximum filling level 58. The level of fuel in the filler pipe 64 would not be high enough to trigger the automatic shut-off mechanism of a fuel dispenser so as to interrupt the fuel dispenser. For this reason, a trapping device 74 is provided and connected via a fuel vapor line 70 to an activated carbon filter 72 for trapping fuel vapors associated with the fuel tank 62. The valve unit 76 of the trapping device 74 also determines the maximum filling level 68.

In a manner similar to valve unit 32, valve unit 76 has a control valve 78 and safety valve 80 connected upstream of it. Additionally, a float valve 82 is connected upstream of the safety valve 80. The float member 84 of float valve 82 is spherical and operates to close a connection of the tank interior to the safety valve 80 and control valve 78 when the maximum filling level 68 is reached. This closure permits the fuel in the filler pipe 64 to continue to rise until finally it reaches the filler nozzle of a fuel dispenser introduced into said filler pipe 64 and triggers its automatic shut-off mechanism.

A further structural difference consists in the mode of operation of the control valve 78. Its valve element 85 is vacuum-operated, such that when the engine is running, a suction pipe vacuum is applied to suction line 86 and forces valve element 85 into its closing position, via diaphragm 88 acting against the action of a restoring spring 90. During driving, the connection between fuel tank 62 and activated carbon filter 72 is thus closed allowing for the build-up of positive pressure in the fuel tank 62.

For refuelling, the engine is switched off, whereupon pressure equilibration takes place by the opening of the control valve 78 and no fuel vapors can be forced out of the filler pipe 64 when the latter is opened.

Figure 2A:
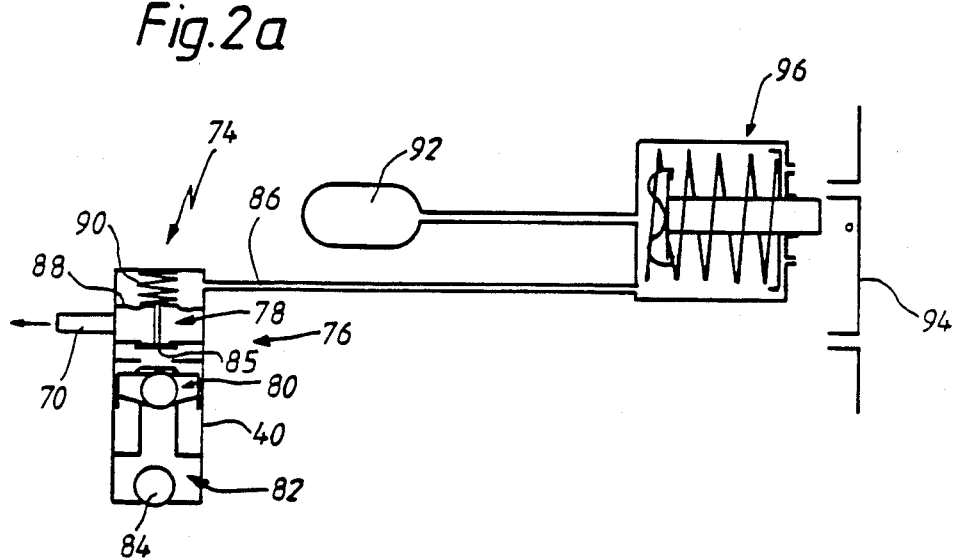
FIGS. 2a and 2b show alternative controls for the control valve.
Figure 2B:
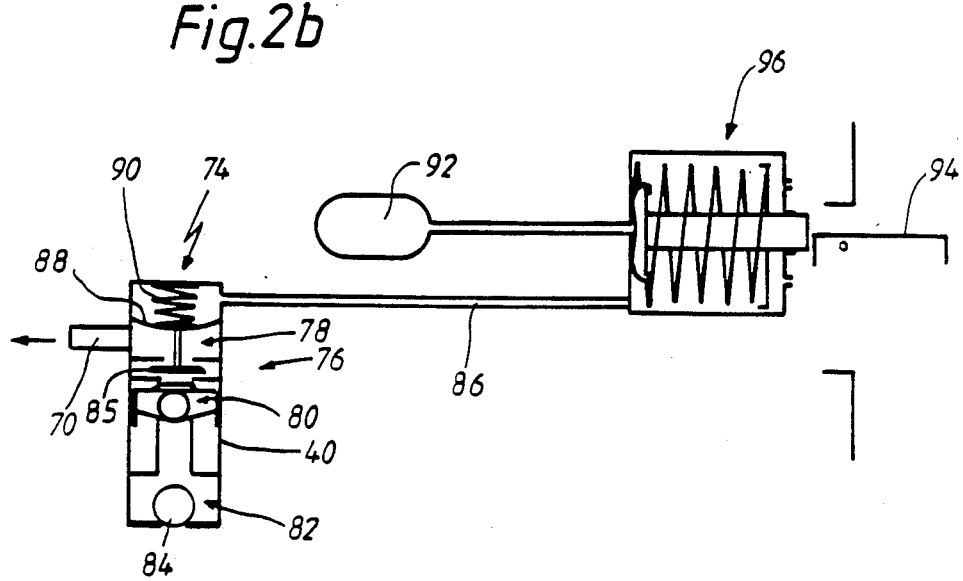

As an alternative and independent control for control valve 78, which is to be kept closed during normal operation of the vehicle by means of a vacuum, is shown in FIG. 2a and 2b. Here the suction line 86 is connected to a vacuum reservoir 92 (FIG. 2a) and this connection is broken by means of a valve 96 which can be operated by a filler inlet compartment lid 94 when the latter is opened (FIG. 2b).

As FIG. 3 shows, a further structural variant can comprise designing the control valve as an automatically opening solenoid valve 98.

For the purpose of closure during normal operation of the vehicle, the solenoid valve 98 can be actuated, for example via an engine tachometer, during the running of the engine via a fuel pump relay. It can furthermore be operated mechanically, e.g. be activatable via the filler inlet compartment lid, in which case it should be designed so as to open automatically in the deenergized condition. This ensures that the fuel tank vapors cannot flow into the activated carbon filter even in the event of a power failure during refuelling.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A device for trapping fuel vapors when refuelling a fuel tank of a motor vehicle including an actuable control valve means which is situated above a maximum fuel level of the fuel tank for opening a fuel vapor line connected between an activated carbon filter and the fuel tank during refueling of the fuel tank and for closing off the fuel vapor line after refuelling has taken place; and
    wherein during refuelling, the control valve means is moved into an open position independently of the fuel dispenser;
    a valve unit means comprising said control valve means and at least an additional valve means in series;
    the additional valve means acting as a safety valve and connected upstream of the control valve means between the control valve means and the fuel tanks;
    and wherein the safety valve means closes the fuel vapor line under the influence of gravity when the fuel tank reaches a certain inclination.

2. A device according to claim 1, wherein the valve unit means has a float valve means connected upstream of the safety valve means and located inside the fuel tank; and wherein said float valve means closes the fuel vapor line when the maximum fuel level is reached.

3. A device accoarding to claim 2, wherein the valve means of the valve unit means are arranged in a common housing which is arranged at an upper wall of the fuel tank.

4. A device according to claims 3, wherein the control valve means is vacuum actuated.

5. A device according to claims 3, wherein the control valve means is a solenoid controlled valve which closed during the time the vehicle engine is running.

6. A device according to claim 2, wherein the control valve means is actuated by power operation and the other valve means are actuated automatically.

7. A device according to claim 6, wherein the control valve means can be moved mechanically in response to the opening of a fuel tank filler inlet compartment lid.

8. Device according to claim 7, wherein the control view is opened by means of a Bowden cable which can be operated by means of the filler inlet compartment lid.

9. A device according to claims 2, wherein the control valve means the is vacuum actuated.

10. A device according to claim 2, wherein the control valve means is a solenoid controlled valve which closed during the time the vehicle engine is running.

11. A device accoarding to claim 1, wherein the valve means of the valve unit means are arranged in a common housing which is arranged at an upper wall of the fuel tank.

12. A device according to claims 11, wherein the control valve means the is vacuum actuated.

13. A device according to claim 11, wherein the control valve means is a solenoid controlled valve which closed during the time the vehicle engine is running.

14. A device according to claim 1, wherein the control valve means is actuated by power operation and the other valve means are actuated automatically.

15. A device according to claim 14, wherein the control valve means can be moved mechanically in response to the opening of a fuel tank filler inlet compartment lid.

16. Device according to claim 15, wherein the control valve means is opened by means of a Bowden cable which can be operated by means of the filler inlet, compartment lid.

17. A device according to claims 14, wherein the control valve means is vacuum actuated.

18. A device according to claim 14, wherein the control valve means is a solenoid controlled valve which closes during the time the vehicle engine is running.

19. A device according to claim 1, wherein the control valve means is vacuum actuated.

20. A device according to claims 1, wherein the control valve means is a solenoid controlled valve which closed during the time the vehicle engine is running.

* * * * *